United States Patent [19]

Naumann et al.

[11] Patent Number: 4,600,217
[45] Date of Patent: Jul. 15, 1986

[54] APPARATUS FOR MOVING THE TONGUE OF A SEAT BELT INTO A POSITION FOR EASY INSERTION INTO A BUCKLE

[75] Inventors: Fritz Naumann, Stammham; Hans-Günther Haldenwanger, Ingolstadt, both of Fed. Rep. of Germany

[73] Assignee: Audi AG., Ingolstadt, Fed. Rep. of Germany

[21] Appl. No.: 674,590

[22] Filed: Nov. 27, 1984

[30] Foreign Application Priority Data

Dec. 2, 1983 [DE] Fed. Rep. of Germany ....... 3343619

[51] Int. Cl.$^4$ ...................... B60R 21/10; A62B 35/00
[52] U.S. Cl. .................................... 280/808; 297/483
[58] Field of Search ...................... 280/801, 804, 808; 297/468, 483, 473

[56] References Cited

U.S. PATENT DOCUMENTS 4,360,225 11/1982 Thomas et al. .................... 280/804

FOREIGN PATENT DOCUMENTS 2713172 10/1978 Fed. Rep. of Germany ...... 280/804
2920094 11/1980 Fed. Rep. of Germany ...... 280/808

Primary Examiner—Joseph F. Peters, Jr.
Assistant Examiner—Kenneth R. Rice
Attorney, Agent, or Firm—Karl Hormann

[57] ABSTRACT

The invention provides an apparatus for automatically moving the tongue of a seat belt into a position in which it may conveniently be grasped by an operator for insertion into a buckle. The apparatus comprises an inflatable bellows engageable with the tongue and extensible into the position by the application of pressure. The bellows may be retracted by vacuum pressure or by integral resilient means in response to the tongue having been inserted into the buckle.

15 Claims, 4 Drawing Figures

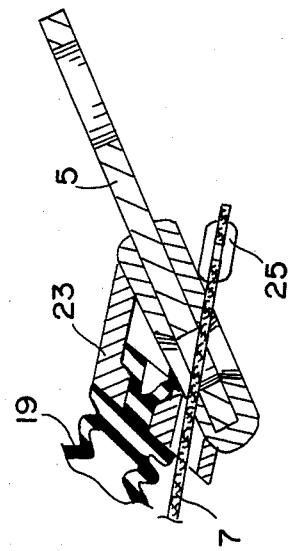
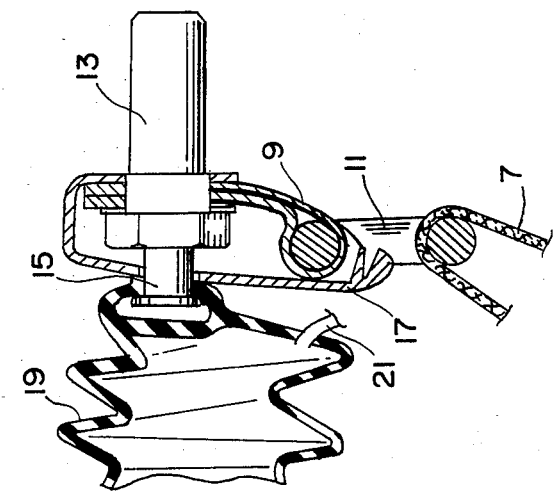

APPARATUS FOR MOVING THE TONGUE OF A SEAT BELT INTO A POSITION FOR EASY INSERTION INTO A BUCKLE

The present invention relates to automotive seat belts. More particularly, the invention is directed to an apparatus for automatically moving the tongue of a seat belt from a storage position into a position where it can conveniently be grasped by an operator for insertion into an associated buckle.

Such apparatus have been found to be of particular advantage in connection with two-door automobiles in that they permit to move the tongue of a seat belt automatically from a position in which it does not interfere with the entering of a passenger to the rear seat of the automobile, into a position where the operator may grasp it to secure it in an associated buckle. An apparatus of this general kind has been disclosed by West German Patent Specification DE OS No. 31 20 843. In accordance with this known arrangement the belt or belt buckle is moved to a position convenient for the operator, by means of a mechanical arm which is movable out of a compartment in the interior shell of the rear automobile compartment under the control of an electric motor and an appropriate control linkage. Owing to its many mechanical components this known apparatus is very complicated indeed and requires rather a large storage compartment. However, many automobiles either have no space for such a compartment, or such a compartment would create unwanted problems, for instance, where there is to be provided a moveable rear side window.

It is thus an object of the present invention to provide means for improved seat belt arrangements of the kind referred to above.

Another object is the provision of an automatically moveable seat belt arrangment of the general kind referred to but being of simple construction.

A further object of the invention resides in the provision of an automatically moveable seat belt arrangment of improved reliability of operation.

Still another object is to provide such a seat belt arrangement which requires very little space for its installation.

A further, more general, object of the invention resides in the provision of an apparatus of simple construction by means of which the tongue of a seat belt may automatically be moved from a storage position to a position where an operator may conveniently grasp it for mating with an associated buckle.

In the accomplishment of these and other objects the invention, in a preferred embodiment thereof, comprises an inflatable moving member such as a bellows which during its inflation moves the tongue of a seat belt into a position where it may be conveniently grasped by an operator. Inflating the moving member is advantageously accomplished by a pump.

For moving the tongue of the seat belt from a storage position to a position where an operator may conveniently grasp it for manual insertion and latching in a buckle, the apparatus may also comprise a seat belt including tongue means moveable between retracted and extended positions, inflatable means connectible to a source of pressure for movement between a retracted storage condition and an extended position, means for operatively connecting the inflatable means and the tongue means at least during movement from the retracted condition to the extended position for moving the tongue to the extended position, and means for controlling the movement of the inflatable means such that in its extended condition it puts the tongue substantially into the position for convenient manual insertion into the buckle.

The advantages of such an inflatable moving member are numerous. Among others, such an arrangement permits moving the tongue of the belt with very few mechanical components. Also, when idle, the member may in its deflated condition be stored in a very small space. Owing to its small dimensions in its idle deflated condition, the moving member in accordance with the invention may be stored in the interior of the center post of a passanger automobile. The space below the rear side window may thus be left empty for other purposes. A pump required for inflating the bellows may be mounted in any convenient position in the automobile and may be connected to other systems or reservoirs. For instance, it may be connected to a central door locking system. The connection between pump and the bellows may be mounted within a door post of the chassis.

The apparatus may be actuated by switches responsive to closure of the door or engine ignition.

Many different possibilities offer themselves regarding the construction of the moving member and its location within the vehicle. Advantageously, however, the inflatable moving member comprises a bellows which in its idle deflated condition may be housed within a cavity in the center post and which during inflation moves outwardly, and with suitable grippers seizes the belt and/or the tongue to move it into a position convenient for the operator. Once the belt has been fastened by latching of the tongue in the associated buckle, the moving member may be deflated and returned to its storage position. As the moving member is no longer connected to the belt after it has been fastened, no additional frictional forces are imposed on the belt system. Such additional friction would otherwise not only require increased spring force for coiling the belt after use, but would also render it less comfortable for the operator.

In a lap and shoulder or three point belt system the moving member may advantageously be mounted adjacent the bracket or deflector member through which the shoulder portion of the belt is guided from the door post to the buckle. By using a foldable bellows, even where it requires considerable extensibility, the bellows, when in its deflated condition may be stored in a small space. By arranging the movable member or bellows for attachment at the bracket or deflector of the shoulder portion, it may easily be mounted in the vehicle as an option or accessory without requiring space in the side wall of the chassis.

For mounting the bellows it has been found to be advantageous and efficient to use the same fastener as the one to which the bracket or deflector is attached. Thus, no additional parts are required.

In order to move the belt or its tongue into a position in which it may be grasped without effort by the operator it may be advantageous to form the bellows comprising the moving member in such a way that it extends in a curved path, or takes on a curved configuration, when it is inflated. This may be accomplished by appropriately preforming the bellows or by constructing its walls in different thicknesses, or from materials of different degrees of stiffness. In this connection, it is deemed to be advantageous to provide support rings in the bellows, and in a particular embodiment one of the rings may be provided with means for guiding the belt.

In order to insure that the moving member or bellows retracts sufficiently far into its storage position to prevent interferring with passengers entering to the rear seat of the car, the bellows may be actively deflated by vacuum pressure. A double action pump which may be switched from positive pressure to vacuum pressure as soon as the tongue of the belt has been latched in its buckle, is well suited for this purpose.

However, where a simple pressure pump is used, bellows of sufficient inherent resiliency, or provided with appropriate spring means, may be used for returning it to its storage position after the pump has been switched off.

Other objects will in part be obvious and will in part appear hereinafter.

The invention accordingly comprises the apparatus possessing the construction, combination of elements and arrangement of parts which are exemplified in the following detailed disclosure, and the scope of the invention of which will be indicated in the appended claims.

For a fuller understanding of the invention, reference should be had to the following detailed description taken in connection with the accompanying drawings, wherein:

FIG. 2 is a sectional view along line II—II of FIG. 1;

FIG. 3 is a sectional view along line III—III of FIG. 1; and

FIG. 1 depicts that portion of a lap and shoulder or three point seat belt system of a passenger car at which the shoulder section of the belt is guided around a deflector bracket. The system is provided with means for moving a tongue 5 of the belt into a position where it may be grasped by an operator for insertion into a buckle (not shown).

Figure 1:
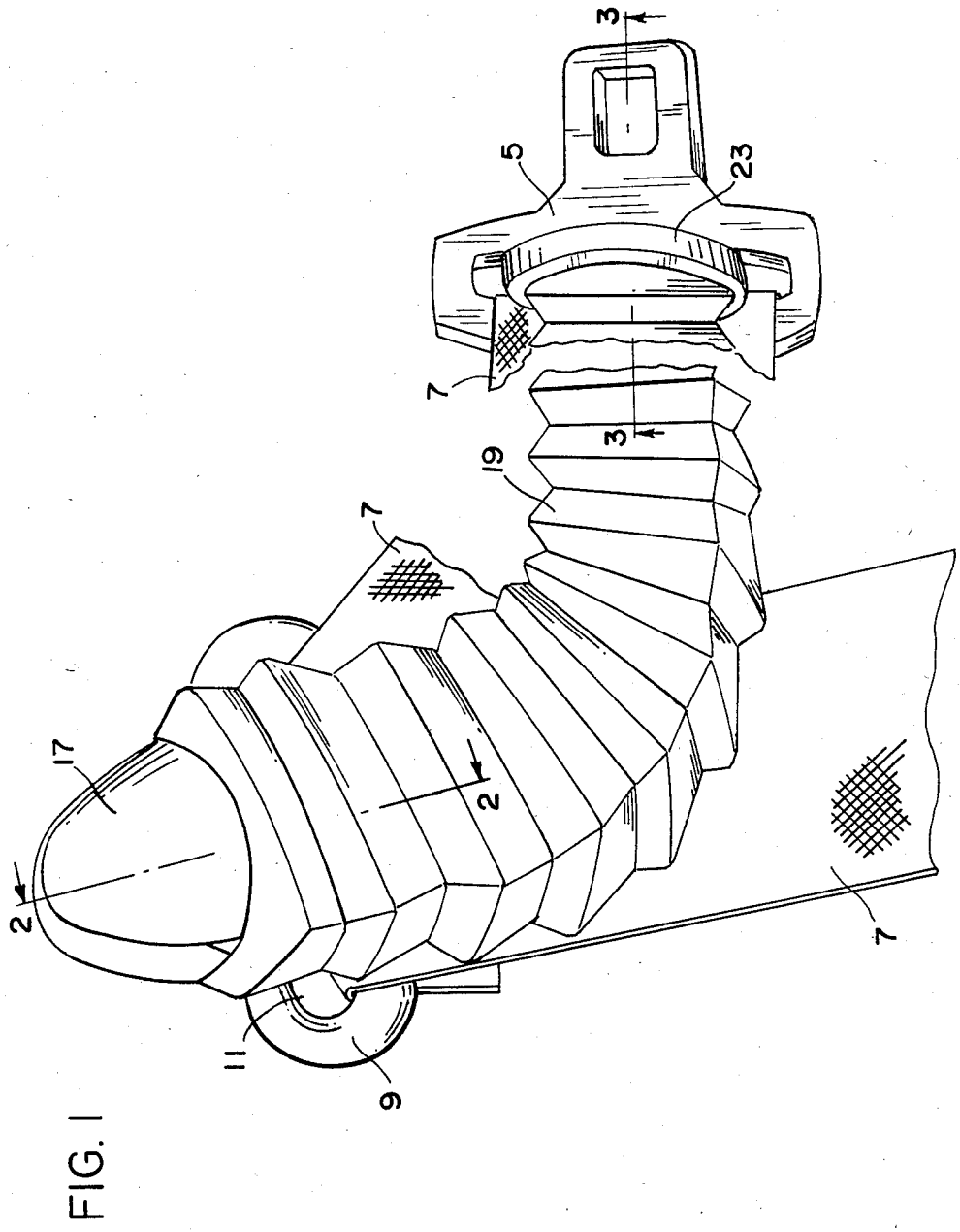
FIG. 1 is a view in persepective of a member comprising a foldable bellows for moving the tongue of a seat belt, in accordance with the invention.

For deflecting the shoulder portion of the belt 7 there is provided a bracket or deflector 9 affixed to an upper portion of a door post (not shown) of an automotive vehicle. The deflector 9 is provided with an eyelet 11 through which the belt 7 is guided and is mounted to the center post by means of a bolt 13. A foldable bellows 19 is affixed by one of its ends to an extension 15 of the bolt 13. The extension 15 penetrates through a cover plate 17 of the bracket 9.

The foldable bellows 19 serves to move the tongue 5 of the belt 7 into a position where it may be conveniently grasped by an operator for mating with the buckle. For this purpose, the bellows 19 may be extended from a collapsed storage condition to the extended condition shown in FIG. 1. A double acting pump (not shown) may be connected to the bellows 19 by a line 21 to provide pressurized air for extending the bellows and to provide vacuum pressure for retracting the bellows. The bellows 19 may be made of an elastic material. To impart to the bellows 19 a desired curved configuration during its inflation its walls may be made of different thickness or from materials of different stiffnesses.

The other end of the bellows 19 is provided with a gripper member 23 which is adapted to engage the tongue 5 when the bellows 19 is extended. The gripper 23 partially embraces the belt 7 at its section on the side of the deflector opposite the retractor (not shown). To prevent the tongue 5 from sliding beyond a certain point along the belt 7, a rivet 25 or the like is seated in an appropriate position in the belt 7.

The apparatus functions in the following manner: Initially the foldable bellows 19 is positioned in its retracted collapsed condition adjacent the deflector 9. In this condition it cannot interfere with passengers entering to the rear seat of the vehicle. When the operator sits down in the front seat and shuts the door, switch contacts in the front seat or door cause actuation of a pump for inflating the bellows 19 by way of the line 21. In this manner, the bellows 19 is moved into its extended condition. During the movement of the bellows 19 the gripper 23 slides along the belt 7 pushing the tongue 5 into engagement with the rivet 25 and into a position where it may be conveniently grasped by the operator who may then pull out the belt 7 further for inserting and latching the tongue 5 in the buckle (not shown).

As soon as the tongue 5 has been latched in the buckle, the pump may be switched to vacuum pressure for deflating the bellows 19 and quickly retracting it to its initial storage position.

Figure 4:
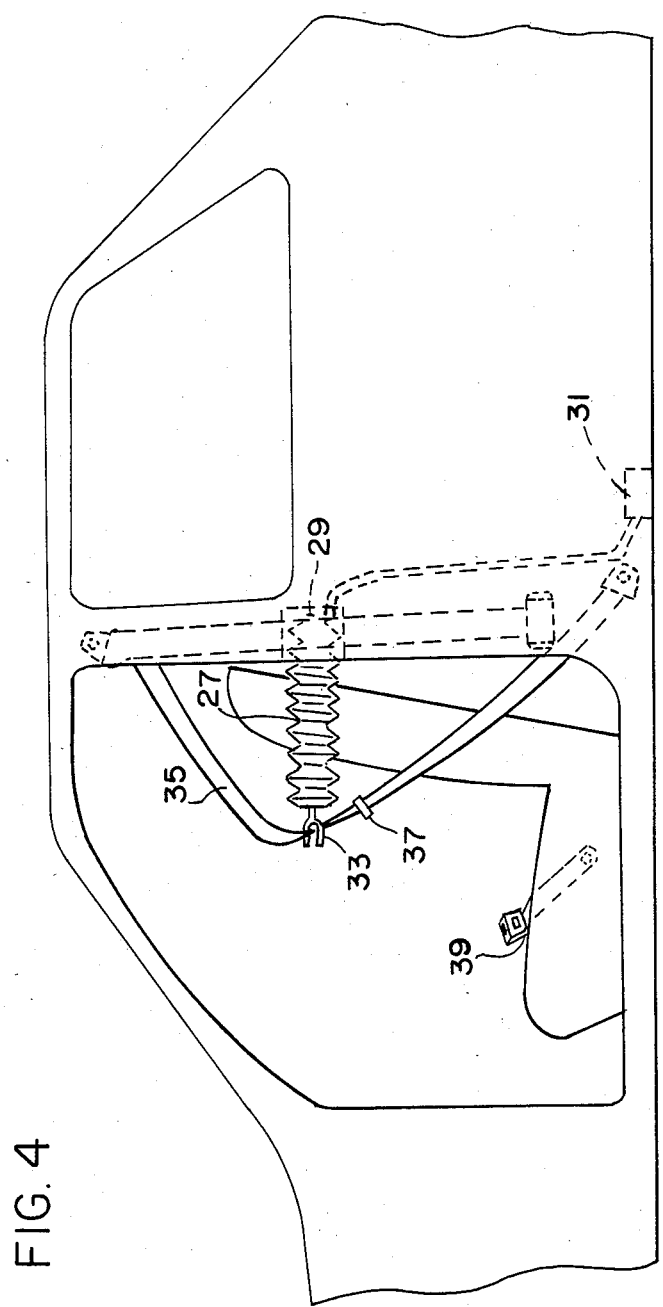
FIG. 4 shows an alternate embodiment of an apparatus in accordance with the invention.

FIG. 4 depicts an alternate embodiment of the invention. A bellows, 27 when in its collapsed inoperative condition, is located in a recess or cavity 29 in the chassis of the vehicle. By inflating the bellows 27 by means of a pump 31 the bellows 27 may be extended in the manner described above. During the resulting movement, a fork 33 attached to the free end of the bellows 37 seizes the belt 35 and moves it into a position in which an operator may conveniently grasp a tongue 37 slidably mounted on the belt 35. After the tongue 37 is inserted and latched in an associated buckle 39 a switch changes the operation of the pump 31 from providing positive pressure to providing vacuum pressure. Thus the bellows 37 is collapsed and retracted to its initial position within the cavity 29. In this manner the seat belt 37 is disengaged from the fork 35 of the bellows 37 and is free of additional frictional force otherwise resulting from such engagement.

Since certain changes may be made in the apparatus described without departing from the scope of the invention, all matter contained in this description or shown in the appended drawings is to be interpreted as illustrative only and not as limiting.

We claim:

1. An apparatus for automatically moving the tongue of a seat belt from a storage position within an automotive vehicle to a position for convenient manual insertion into a buckle, comprising:
   a seat belt including tongue means movable between a retracted position and an extended position;
   inflatable means connectible to a source of pressure for movement between a retracted storage condition and an extended condition;
   means for operatively connecting the inflatable means and the tongue means at least during movement from the retracted condition to extended condition for moving the tongue to the extended position; and
   means for controlling the movement of the inflatable means such that in its extended condition it puts the tongue substantially into the position for convenient manual insertion into the buckle.

2. The apparatus of claim 1 wherein the inflatable means comprises a collapsible bellows which in its extended condition assumes an elongated configuration.

3. The apparatus of claim 2, wherein the bellows comprises first and second ends, the first end being affixed to the automotive vehicle and the second end comprising means for engaging the tongue.

4. The apparatus of claim 3 wherein the seat belt comprises a retractor and a deflector positioned between the retractor and the tongue, and wherein the first end of the bellows is affixed adjacent the deflector.

5. The apparatus of claim 4, wherein the deflector and the bellows are affixed to a door post of the vehicle.

6. The apparatus of claim 2, wherein the bellows is preformed such that in its extended condition it assumes a curved configuration for moving the tongue into the position for insertion into the buckle.

7. The apparatus of claim 6, wherein the bellows comprises a plurality of wall members and wherein the curved configuration of the extended bellows is imparted by wall members of different thicknesses.

8. The apparatus of claim 6 wherein the bellows comprises a plurality of wall members of different stiffnesses for imparting the curved configuration to the bellows in its extended condition.

9. The apparatus of claim 2, wherein the bellows comprises a plurality of support rings.

10. The apparatus of claim 9, wherein at least one of the rings comprises means for guiding the tongue into a position for insertion into the buckle.

11. The apparatus of claim 3, wherein the means for engaging the tongue comprises means for sliding along the belt between an inoperative position and a position in which it engages the tongue.

12. The apparatus of claim 1, wherein the source of pressure comprises a pump responsive to closure of a switch for providing pressure to the inflatable means for moving it to its extended condition.

13. The apparatus of claim 12 wherein the pump also provides vacuum pressure for deflating the inflatable means for returning it to its retracted condition.

14. The apparatus of claim 13 wherein the pump provides vacuum pressure in response to the tongue having been inserted into the buckle.

15. The apparatus of claim 2, wherein the bellows comprises resilient means for returning it to its retracted condition.

* * * * *